United States Patent Office 3,592,592
Patented July 13, 1971

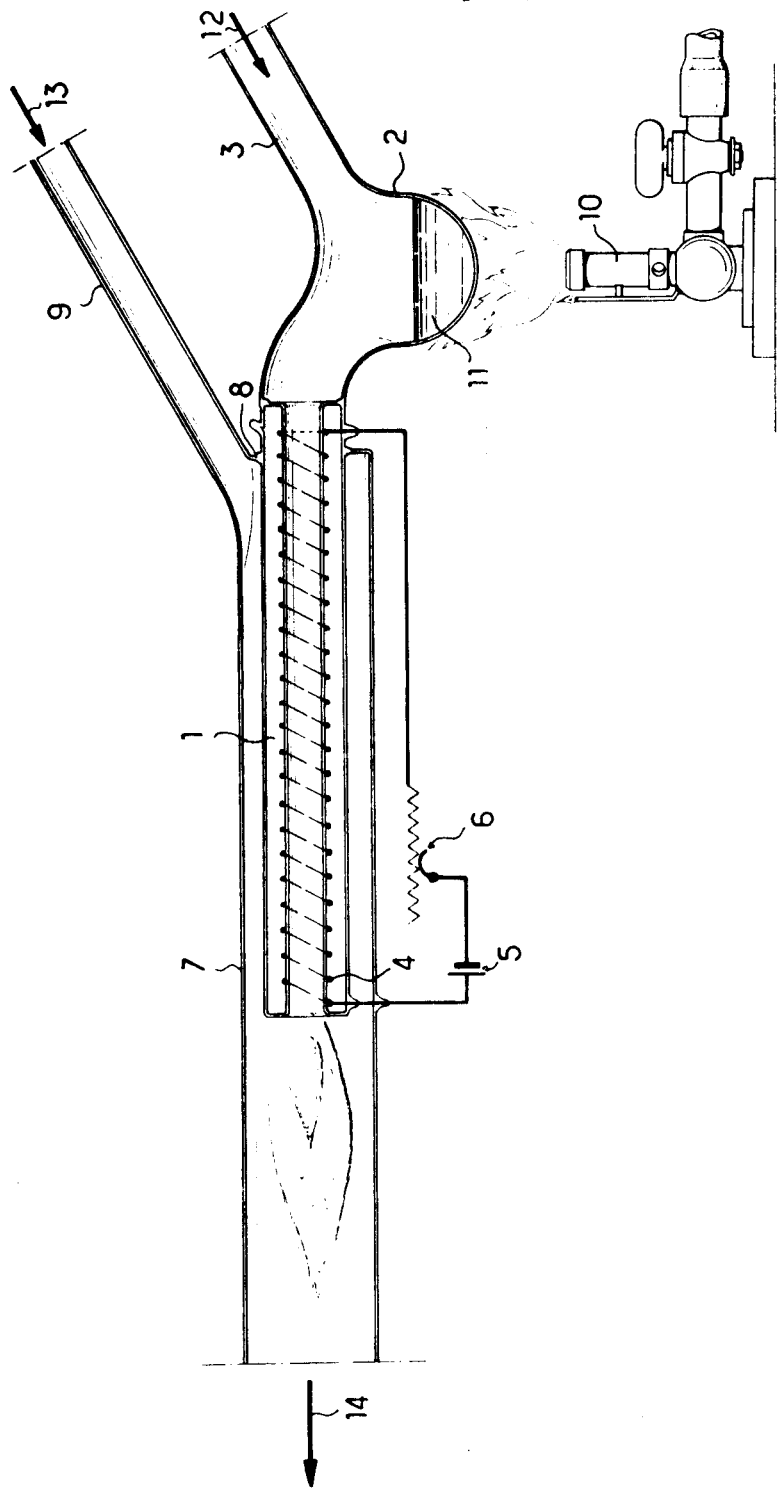

3,592,592
PROCESS FOR PREPARATION OF $SO_3$
Max Schmidt, Wurzburg, Germany, assignor to Research
Corporation, New York, N.Y.
Filed May 17, 1968, Ser. No. 730,174
Claims priority, application France, May 19, 1967,
107,110
Int. Cl. C01b 17/68
U.S. Cl. 23—174                                    1 Claim

ABSTRACT OF THE DISCLOSURE

A process for preparing $SO_3$ is disclosed, wherein sulphur is burned in the presence of an oxygen containing gas and the resultant $SO_3$ is stabilized to prevent decomposition into $SO_2$. The stabilization may be by means of a suitable stabilizing compound, such as Lewis base, or may be by way of thermal quenching.

---

The present invention has as its object a new process for the preparation of $SO_3$.

It is known that the preparation of $SO_3$ assumes a great importance in view of the fact that this compound is used in the process for the preparation of contact sulphuric acid.

It is also known that $SO_3$ has, until now, been obtained industrially by the catalytic oxidation of $SO_2$ into $SO_3$.

The present invention relates to a process allowing the direct preparation of $SO_3$ by the combustion of sulphur with oxygen.

It has been noticed that the combustion of sulphur first of all gave $SO_3$ and that the $SO_3$ so formed immediately decomposed into $SO_2$ on contact with the excess sulphur.

The present invention has as its object a process for the preparation of $SO_3$ characterized by the fact that combustion of sulphur in an oxygen-containing gas is effected, and that a means of stabilizing the $SO_3$ formed initially through this combustion is used.

In one method of the present invention, the $SO_3$ which forms initially is stabilized by effecting the combustion of the sulphur in the presence of a compound such as hydrochloric acid gas or water vapor.

Thus it is possible to carry away the sulphur trioxide vapor by mixing a stream of hydrochloric acid gas containing sulphur vapor with gas containing oxygen at the place where the reaction of combustion is effected.

Generally, at least a stoichiometric amount of Lewis base, for example, the hydrochloric acid gas, will be used, based on the amount of $SO_3$ being formed. Preferably, an excess of the Lewis base will be used, such as, for instance, about 110 to about 1000% excess, or even more. The sulphur vapor is contacted with at least a stoichiometric amount of oxygen, and preferably a large excess of oxygen. Oxygen in excesses as large as 1000% or higher may be used as desired, although it will normally be sufficient to utilize an excess of from 200% to 400%, based on the amount of sulphur vapor.

In a second method of using the process of the present invention, a violent cooling of the combustion gas is effected immediately after the combustion of the sulphur in the oxygen, thereby stabilizing the $SO_3$, which is formed initially during the combustion, by means of a thermal quenching.

Generally the combustion gases will be thermal quenched to a temperature of 150° C. or below, preferably from 150° C. to 80° C. At least a stoichiometric amount of oxygen, based on the sulphur vapors, will be present in the combustion mixture and generally the oxygen will be used in a molar excess of the amount of sulphur. Such an excess may be as high as 1000% or even higher, although normally an excess of 200% to 400% will be preferred.

It is possible, for example, to start the process, and to impinge the combustion gases against a refrigerated wall, kept at an even coolness by a stream of cold water.

The combustion reaction can be effected at the end of the two concentric tubes of a blow-pipe, the inner tube serving to bring a mixture of sulphur vapor in a gas carrier, and the outer tube serving to bring the oxygen.

The figure on the annexed diagram represents an apparatus capable of putting into effect the process of the present invention.

A glass cylinder 1 is welded at the end of a part forming the container 2, connected to a pipeline 3. In the cylinder 1 is an electrical resistance coil 4 connected to a generator 5 by means of a rheostat 6. A vacuum is created in the cylinder 1 after winding of the resistance 4. A glass tube 7 surrounds the cylinder to which it is connected by a joint 8, the tube 7 being equally tied to a pipeline 9. A Bunsen burner 10 heats the container 2.

Inside the container 2 is placed a certain amount of sulphur 11 which has been melted by heating it with the Bunsen burner 10. A stream of hydrochloric acid gas comes in the direction of the arrow 12 down the pipeline 3; this contains a certain quantity of sulphur vapor emitted by the bath of melting sulphur 11, after passing through container 2.

The mixture of hydrochloric acid gas and sulphur vapor is heated during its way down the cylinder 1 by the resistance coil 4, which carries an electrical current, and at the end of the cylinder is contacted with the oxygen coming through the pipeline 9 in the direction of the arrow 13. There is combustion of the sulphur vapor at the end of the cylinder and the gas which emerges from tube 7 in the direction of the arrow 14 shows a notable content of $SO_3$, these compounds having been stabilized during their formation by the presence of hydrochloric gas.

Before further clarifying the invention, various examples of its putting into effect will be described now by virtue of illustration and with no restrictive character.

EXAMPLE I 3 g. of sulphur are brought to boil, and a current of hydrochloric acid gas is passed through the melted mass to pick up sulphur vapor. The gaseous mixture, containing about 5 to 10% sulphur, is combined with a 400% excess of oxygen and lit on a level with a combustion burner. The combustion gas contains 40% $SO_3$, calculated on the total amount of sulphur burned.

EXAMPLE II

Sulphur vapor is entrained by the passing of nitrogen gas over a mass of boiling sulphur. The mixture of nitrogen and sulphur vapor is then passed in an electrically heated tube (about 450° C.). This tube is surrounded by a tube of greater diameter in which is sent a stream of oxygen. Ignition spontaneously produces at the end of the central tube wherein the mixture of nitrogen and sulphur vapor is mixed with the oxygen. The combustion gas is thrown against the cold walls of a water-cooled condenser (about 15° C.). In this manner, it is possible to isolate after combustion 3 g. of sulphur during 15 mins., 41% $SO_3$ calculated on the theoretical quantity. The discharge of oxygen is controlled at 100 liters per hour and that of nitrogen at 15 liters per hour.

What is claimed is:

1. A process for producing $SO_3$ which comprises entraining sulphur vapor in a stream of hydrochloric acid gas, adding oxygen up to 1000% excess over that theoretically necessary to react with the sulphur and combusting the mixture of gases to thereby obtain a product gas stream containing $SO_3$.

References Cited

UNITED STATES PATENTS

| | | | |
|---|---|---|---|
| 2,377,642 | 6/1945 | Mooney et al. | 23—139 |
| 778,099 | 12/1904 | Blackmore | 23—174 |
| 642,390 | 1/1900 | Van Denbergh | 23—174 |

FOREIGN REFERENCES

| | | | |
|---|---|---|---|
| 238,621 | 8/1925 | Great Britain | 23—179 |

OTHER REFERENCES

Sisler et al.: General Chemistry, pp. 342–43 (Macmillan, 1949).

Perry: Chem. Engrs. Handbook, sect. 11, pp. 4–5 (4 ed. McGraw-Hill, 1963).

OSCAR R. VERTIZ, Primary Examiner

C. B. RODMAN, Assistant Examiner